United States Patent
Mangard et al.

(10) Patent No.: US 8,694,977 B2
(45) Date of Patent: Apr. 8, 2014

(54) DISTRIBUTED COMPILING PROCESS WITH INSTRUCTION SIGNATURE SUPPORT

(75) Inventors: Stefan Mangard, Munich (DE); Berndt Gammel, Markt Schwaben (DE); Juergen Duve, Holzkirchen (DE)

(73) Assignee: Infineon Technologies AG, Neubiberg (DE)

( * ) Notice: Subject to any disclaimer, the term of this patent is extended or adjusted under 35 U.S.C. 154(b) by 282 days.

(21) Appl. No.: 13/184,135

(22) Filed: Jul. 15, 2011

(65) Prior Publication Data

US 2013/0019231 A1    Jan. 17, 2013

(51) Int. Cl.
*G06F 9/45* (2006.01)

(52) U.S. Cl.
USPC ........................................................ 717/151

(58) Field of Classification Search
USPC ........................................................ 717/151
See application file for complete search history.

(56) References Cited

U.S. PATENT DOCUMENTS

2011/0055638 A1* 3/2011 Lerouge et al. ................. 714/48

OTHER PUBLICATIONS

Oh, N. et al: "Control-Flow Checking by Software Signatures"; In: IEEE Transactions on Reliability, 2002, pp. 111-122, vol. 51, No. 2.

Schuette, M. et al: Processor Control Flow Monitoring Using Signatured Instruction Streams; In: IEEE Transations on Computers, 1987, pp. 264-276, vol. C-36, No. 3.

Yau, S. et al: "An Approach to Concurrent Control Flow Checking"; In: IEEE Transactions on Software Engineering, 1980, pp. 126-137, vol. SE-6, No. 2.

Patel, K., "Hardware-Software Design Methods for Security and Reliability of MPSoCs", a thesis, School of Computer Science and Engineering, The University of New South Wales, Aug. 2009.

Milenkov, M., "Architectures for Run-Time Verification of Code Integrity", a dissertation, The University of Alabama in Huntsville, 2005.

* cited by examiner

*Primary Examiner* — John Chavis
(74) *Attorney, Agent, or Firm* — Murphy, Bilak & Homiller PLLC

(57) ABSTRACT

A compiler module for providing instruction signature support to a compiler includes a language construct identifier and a placeholder insertion component. The language construct identifier is configured to identify an instruction signature-relevant language construct in a high level language source code supplied to the compiler. The placeholder insertion component is configured to interact with the compiler for inserting at least one instruction signature-related placeholder based on the instruction signature-related language construct into a compiled code processed by the compiler on the basis of the high level language source code.

26 Claims, 6 Drawing Sheets

DISTRIBUTED COMPILING PROCESS WITH INSTRUCTION SIGNATURE SUPPORT

TECHNICAL FIELD

The present application relates to a compiler module for providing instruction signature support to a compiler, and more particularly to processing instruction signature-relevant information during a compiling process of a high level language source code.

BACKGROUND

A programmable computing unit is typically designed to process a sequence of instructions to perform a certain task. The sequence of instructions may also be referred to as program code. The program code is typically stored in a memory and provided to the computing unit at runtime. With a view to information security, it may be desired to protect the instructions from being analyzed while they are stored in the memory or transmitted from the memory to the computing unit. On the other hand, errors may occur during an execution of the program code if the instructions reaching the computing unit differ from desired instructions. Differences between the instruction actually processed by the computing unit and the desired instructions may have a random cause or could be deliberately provoked by an intruder. In any event, errors caused by altered instructions should be detected early.

Control flow checking methods may be used to detect such differences between the instructions actually processed by the computing unit and the desired instructions. The underlying principle of control flow checking methods that are based on instruction signatures is to sum up the instructions executed during runtime of a program in a checksum (i.e., the signature) during the runtime of the program and to verify at predetermined program points whether the checksum matches a reference value. A difference between the checksum and the reference value indicates a possible deviation between the actual program execution and an intended program execution.

When a program supporting control flow checking is created or compiled, most of the commonly known control flow checking methods require that so-called update values are inserted at specific points in the program. If, for example, a program jump or branching point occurs and the two different paths (different in the sense that different instruction sequences are executed and lead to different signatures) merge again, the signatures resulting from an execution of the paths need to be consistent at the merge point. To this end, an update value is inserted into at least one of the paths. Branches occur at conditional (direct) jumps, indirect jumps, direct and indirect function calls. Furthermore, reference values are required at the program point where the comparison of the signature calculated during runtime and the reference value are performed. These reference values need to be introduced at the appropriate program points into the program, as well.

SUMMARY

Embodiments described herein provide a compiler module for providing instruction signature support to a compiler. The compiler module comprises a language construct identifier configured to identify an instruction signature-relevant language construct in a high level language source code supplied to the compiler and a placeholder insertion component configured to interact with the compiler for inserting at least one instruction signature-related placeholder based on the instruction signature-related language construct into a compiled code processed by the compiler on the basis of the high level language source code.

Further embodiments described herein provide an instruction signature generator, including an input for a compiled code, a placeholder identifier, a signature calculator, and a placeholder replacer. The placeholder identifier is configured to identify an instruction signature-related placeholder in the compiled code. The signature calculator is configured to determine a signature value for a program point in the compiled code at which the instruction signature-related placeholder occurs. The placeholder replacer is configured to insert a compiled code segment on the basis of the signature value at the program point.

Further embodiments described herein provide a compiler interface data structure, including compiled instructions, wherein at least one of the compiled instructions is an instruction signature-related placeholder.

Further embodiments described provide a method for processing instruction signature-relevant information during a compiling process of a high level language source code, the method including: identifying an instruction signature-relevant language construct in the high level language source code; interacting with the compiling process in order to insert at least one instruction signature-related placeholder based on the instruction signature-relevant language construct into a compiled code processed by the compiling process on the basis of the high level language source code.

Further embodiments described herein provide a computer readable digital storage medium having stored thereon a computer program having a program code for performing, when running on a computer, a method for processing instruction signature-relevant information during a compiling process of a high level language source code, the method including: identifying an instruction signature-relevant language construct in the high level language source code; interacting with the compiling process in order to insert at least one instruction signature-related placeholder based on the instruction signature-relevant language construct into a compiled code processed by the compiling process on the basis of the high level language source code.

Further embodiments described herein provide a method for generating an instruction signature, the method including: determining the program location where an instruction signature-related placeholder should be inserted in a compiled code, determining a signature value for a program location in the compiled code at which the instruction signature-related placeholder occurs, and inserting a compiled code segment at the program location, which implicitly or explicitly generates the update on the basis of the determined signature value.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
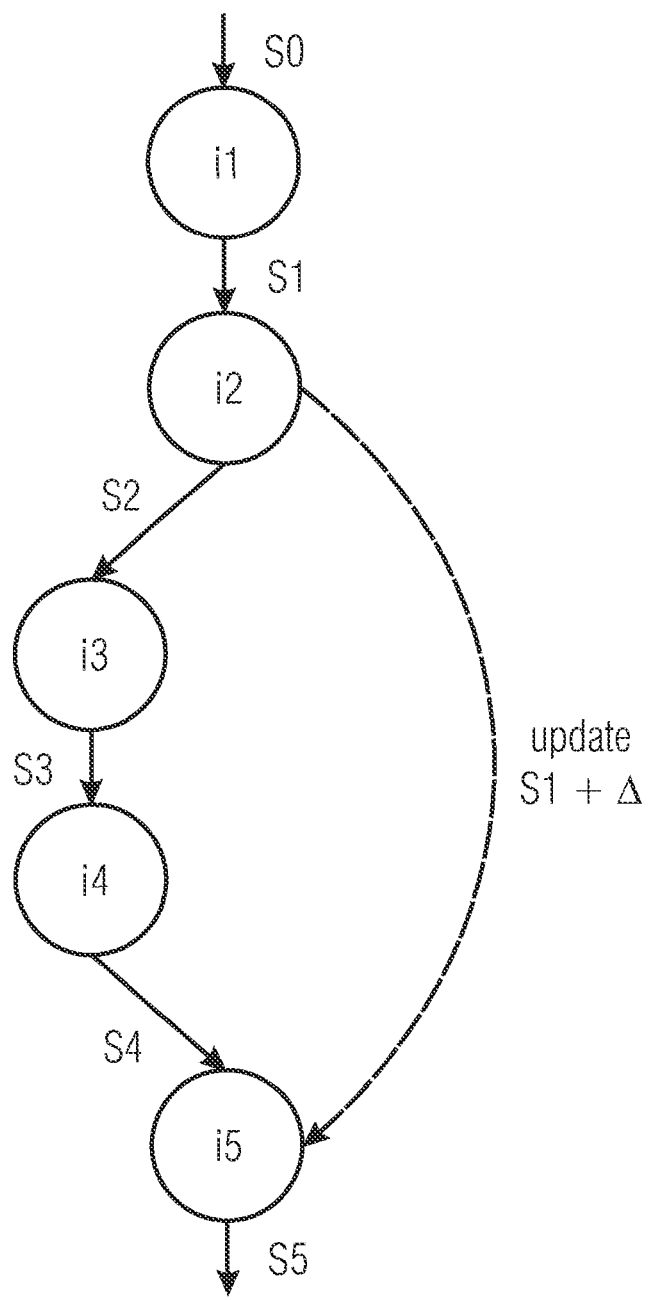
FIG. 1 shows a schematic flow diagram of an instruction sequence including a conditional branch, a default path, and a non-default path.

Instruction stream signatures typically provide a relatively strong integrity protection of the program code. As can be seen in FIG. 1, each code sequence with conditional branch instructions (e.g. instruction i2) has one "default path", in FIG. 1 via the instructions i3 and i4 to the merging point at instruction i5. For this "default path" a signature S5 is calculated by a static code analyzer. To handle a "non default path" (e.g. from instruction i2 directly to instruction i5), at each conditional branch an update of the signature is performed so that the signature is the same as if the default path would have been taken. This is illustrated in FIG. 1 by the arrow labeled "update S1+Δ" which means that S1 is modified in the same manner as S1 would have been modified by the instruction i3 and i4 if the default path would have been taken. Which path is the default path may be implicitly defined by the user or the programmer if the default path is the only path without update from start to end. In general any of the paths can be the default path.

A realistic program typically contains a plurality of program points with update values or reference values. The update and reference values are herein commonly referred to as signature values. The positions or program points where the signature values are inserted are referred to as signature positions. The abbreviation ISS stands for Instruction Stream Signature.

One method for creating control flow protected code is that the programmer manually inserts the signature values in selected parts of the code at the signature positions that are known to him. To this end, the programmer has to determine both the signature values and the signature positions himself. However, many compilers and linkers perform optimizing steps and modifications of the instruction sequences within the program code, which are difficult to anticipate by the programmer.

Having the programmer determine the signature values and the signature positions himself may lead to an elaborate, error-prone, iterative work flow and to restrictions depending on which level the signature values can be inserted. Some of the restrictions that may arise are:

When inserting the signature values in a high level language the programmer may typically use only a subset of the language constructs of a programming language for the insertion of signature values to be possible at all. For example, with specific language constructs in commonly used high level programming languages not all signature positions are accessible from the source code level. A conditional branch of the form
a) if x>0 and x<1 then
   1. instruction sequence A
b) end if
   1. instruction sequence B
may frequently result in two conditional jumps, because two conditions are checked in the first instruction in order to arrive at the instruction sequence A. A good compiler would, however, avoid to check both conditions in order to cause only one jump, as this would result in more than 50% slower code on average. Therefore, two update values would have to be inserted in the two non-default paths. This, however, is not possible at the source code level and hence another program construct has to be used.

Inserting signature values at assembler language level is not always possible for code that has been written in a high level language. Many compilers directly generate binary code (machine language code) and the assembler level is not available at all.

An insertion of signature values at the binary code level (machine code level) leads to shifts of instructions in the program code and hence the jump destinations have to be corrected accordingly. This process is extremely complex, because all jump origins and jump destinations have to be analyzed. Moreover, it is also possible that the jump or branch instructions even have to be replaced because the jump distances shift so much that they may be beyond the range of the jump instruction that is provided in the binary code.

On every level the programmer can make mistakes at finding the signature positions (e.g., inadvertent omission of a signature position) and/or erroneously calculate signature values.

Optimizations performed by the compiler and/or the linker may compel the programmer to further limitations and/or efforts. In particular, the code modifications by the compiler and linker may be addressed as follows:

The programmer first creates binary code by means of the compiler and the linker.

The programmer selects an instruction signature method that is transparent with respect to the modifications caused by the compiler and the linker. Hereby the effect of the signature is massively reduced because the instruction signature method being transparent to the compiler and linker modifications.

The compiler module, the instruction signature generator, the compiler interface data structure, the method for processing instruction signature-relevant information during a compiling process of a high level language source code, and a corresponding computer readable digital storage medium according to the embodiments described herein address the shortcomings of the existing instruction signature methods. According to the embodiments described herein, measures performed during the compiling step and a subsequent signature generation step are combined in an effective way. The embodiments described herein thus enable a complete support for common programming languages so that i) the syntax of the programming language may be used to the full extent in control flow protected programs and program parts, and ii) the generation of control flow protected programs or program parts from, e.g., unprotected program parts may be performed in a virtually fully automated manner. The embodiments described herein thus relate to a distributed compiling process with instruction signature support and/or to a generation of (computer) programs with instruction flow control.

The embodiments described herein facilitate the automation of the insertion and the calculation of signature values, as well as the separation of the process in two main stages (substantially the insertion of placeholders and the calculation). The embodiments described herein also relate to the interface(s) between the two steps. The two main stages are performed by separate tools, a compiler module ("signature compiler") and an instruction signature generator.

The programmer may influence the application of the instruction signature support via the high level language source code that is provided to the compiler.

For example, at the beginning of the code to be protected the user may enable the ISS (instruction stream signature) by a function FCT_ISS_Start( ). At the end of the code sequence (or protected program code segment) to be protected a function FCT_ISS_Stop( )checks the signature and switches the ISS off again. A constant parameter ref used in the function FCT_ISS_Start( )is calculated at a later time by the signature instruction generator and patched in a file (.elf file) including the compiled code by a static code checker (or instruction signature generator). At the very beginning of the function an ISS_UPDATE a placeholder has to be inserted where the constant value is calculated and patched by the static code checker. After each function call, direct and indirect calls, an additional ISS_UPDATE placeholder has to be inserted where the constant is calculated and patched such that the correct value at the next FCT_ISS_Check( )or FCT_ISS_STOP( ) is reached.

With the function FCT_ISS_Status( )the user can check whether an ISS code sequence has been executed correctly. During a running ISS code sequence the user can insert additional checkpoints at security critical points via FCT_ISS_Check( ), where the constant parameter ref is calculated and patched such that the expected value is in a dedicated register (ISS_DATA register) of the processor or of a signature module, provided that the execution of the instruction did not contain an error.

Figure 2:
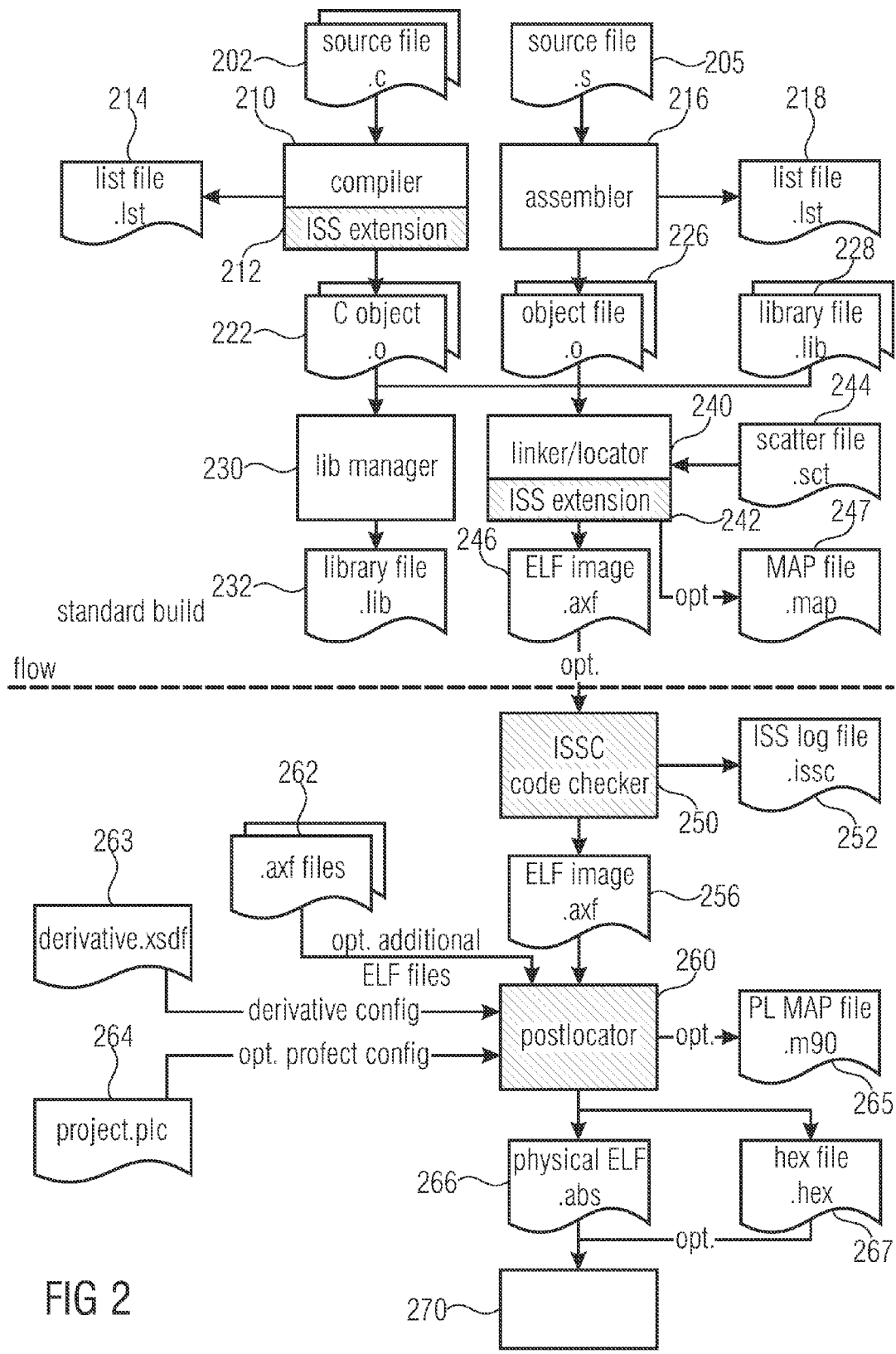
FIG. 2 shows a schematic flow diagram of a compiling process providing instruction signature support.

FIG. 2 illustrates the ISS integration in the tool flow, i.e., in a compiling environment used for transforming a high level language source code into a binary code capable of being (directly) executed by a processor. The ISS support basically has two parts:

the compiler support (e.g., in the form of an external or internal compiler module) for ISS_UPDATE placeholder insertion and forwarding of some information to the static code checker; the compiler support to recognize program regions (e.g. functions) which should be ISS protected; the compiler support to recognize special ISS related functions, such as FCT_ISS_Check( ) The compiler extended by the instruction signature support facility is also referred to as "signature compiler" herein.

an instruction signature generator or static code checker, being a post processing tool that does the signature calculation and replacing of ISS_UPDATE placeholder by the signature values.

In order to provide a general understanding of the interaction of the two parts, the main functions of the signature compiler and the instruction signature generator are briefly described as follows.

The signature compiler typically implements the following aspects:

insertion of placeholders for signature values at signature positions. The positions are determined on the basis of pragmas and/or keywords at source code level and a set of rules. The set of rules will be explained in more detail below.

an optional generation of control information, called "signature control information"

the provision of software libraries called "signature library functions", the elements of which are selected on the basis of the control information.

The instruction signature generator typically implements the following aspects:

reading the compiled code generated by the signature compiler and, if applicable, the signature control information;

calculating the signature values based on a basic block and a default path analysis; and inserting the calculated signature values at the positions of the corresponding placeholders. The notion of a "signature insertion" generally means inserting one or more machine instructions at the location of the place holder, which contain the information on the signature value and, optionally, the necessary instructions to handle the signature value, e.g. to update the signature.

In FIG. 2, one or more source files 202 (for example in the high level language C, as indicated by the file name extension ".c") is/are supplied to a compiler 210. The compiler 210 includes a compiler module 212 ("ISS extension") which adds support for instruction signature-specific processing to the compiler 210. As shown in FIG. 2, the compiler module 212 may be integrated with the compiler 210. In the alternative, the compiler module 212 may be an external module in the form of, for example, a dynamically linked library, dynamic shared object, an add-on, a plug-in, or a software extension. The compiler 210 produces an object file 222 with the file name extension ".o" on the basis of the source file(s) 202. In addition, the compiler 210 may produce a list file 214, mostly for informative and/or debugging purposes. The compiled code within the object file 222 typically includes several instruction signature-related placeholders at various program points. The instruction signature-related placeholders have been added to the compiled code by the compiler module 212 in order to reserve memory space which is available for a future insertion of the signature values. The compiler module 212 may perform the insertion of the placeholders substantially concurrently with the compiler 210 compiling the source code. In this manner the compiler 210 is aware of the inserted placeholders at an early stage of the compiling process and may take the information about the placeholders, their locations and their sizes into account when continuing with the compiling process, in particular when calculating branch or jump destinations. The compiler module 212 may monitor the progress of the compiling process, i.e., which language construct within the source code 202 is currently processed by the compiler 210. The insertion of the signature-related placeholder preserves the logical function of original high-level language code given to the compiler 210. The compiler 210 is aware that optimization stages do not modify or move the inserted placeholders in a way that destroys the error checking capabilities of ISS, e.g. by hoisting signature updates outside a loop during loop invariant optimization.

The compiled code may be a machine language code. The placeholder insertion component may be configured to select the at least one instruction signature-related placeholder so that a size of the at least one instruction signature-related placeholder has a size equal to a size of a machine language instruction or a sequence of machine language instructions eventually replacing the at least one instruction signature-related placeholder in the compiled code.

In the alternative to using a source file written in a high level language such as C in connection with the compiler 210, a programmer may also chose to write a source file 205 in an assembler language which may then be processed by an assembler 216. The assembler 216 also generates an object file 226 and an optional list file 218. In FIG. 2 the assembler 216 does not include a module which would add support for instruction signature-specific processing to the assembler 216. Hence, the programmer adds any instruction signature-related placeholders into the assembler listing himself, for example, via a macro which writes a predetermined binary code at the program point where it occurs. Although not illustrated in FIG. 2, the assembler 216 could, in general, include or interact with an assembler module providing similar functionality as the compiler module 212.

Depending on whether it is intended to generate an executable program or a software library file from the object file 222, the object file 222 is fed to a library manager 230 or a linker/locator 240. In a similar manner, the object file 226 created by the assembler 216 may be fed to the library manager 230 or the linker/locater 240. Furthermore, one or more library files may be supplied to the library manager 230 or the linker/locater 240. The library manager 230 outputs a library file 232. The linker/locator 240 outputs an ELF (executable and linkable file) image 246. The linker/locator 240 may use a scatter file 244 as another input for the linking and locating process which basically determines how the memory layout of a processor is organized when the resulting ELF image 246 is loaded. The linker/locator 240 includes an instruction stream signature (ISS) extension 242 which may produce an option map file 247.

Except for the instruction signature-related extensions 212 and 242 in the compiler 210 and the linker/locator 242, respectively, the compiling and linking environment is substantially equal to a standard build flow up to the point indicated by the horizontal dashed line in FIG. 2.

The ELF image 246 still contains the instruction signature-relevant placeholders inserted by the compiler module 212. In order to convert these placeholders into useful instructions or data for the processor on which the program will eventually run, an instruction signature generator 250 processes the ELF image 246 to create a modified ELF image 256. In the modified ELF image 256 the instruction signature-related placeholders have been replaced by signature values that correspond to the program point, i.e., the signature location, at which the placeholder occurs. The instruction signature generator 250 (also referred to as "(static) code checker") searches the placeholders in the compiled code. Furthermore, the instruction signature generator 250 may perform a basic block analysis and a default path analysis in order to find out via which instruction sequence the program point of the placeholder can be reached as these determine the signature value at the program point. In the alternative, the instruction signature generator 250 may receive corresponding basic block and default path information from, e.g., the compiler 210 or the linker/locator 240 in the form of the list file 214 or map file 247. On the basis of the basic block and default path analysis or information and an initial signature value the instruction signature generator 250 may then determine the reference signature values at the program points where the placeholders occur. The instruction signature generator 250 may "wade through" the ELF image 246 from placeholder to placeholder in the order they may be executed when the program is running in order to find out which instructions are performed between two placeholder program points if the default path or a non-default path (if present) is taken. In the ELF image 256 output by the instruction signature generator 250 the placeholders have been replaced with the signature values calculated by the instruction signature generator 250.

The modified ELF image 256 is input to a postlocator 260 which creates a physical ELF image 266 and/or a hexadecimal file 267. Furthermore, the postlocator 260 may use one or more additional ELF images 262, a derivative configuration 263, and an optional project configuration 264. Optionally, the postlocator 260 may output a map file 265.

The physical ELF image 266 or the hexadecimal file 267 may be executed on a processor 270 which supports instruction signature tracking. In the alternative, the physical ELF image 266 or the hexadecimal file 267 may be executed on a simulator (not shown).

The basic functionality of the signature compiler has been briefly described above. In more detail, the signature compiler performs the typical actions of a standard compiler, supplemented with actions specific to the embodiments described herein. During an action of parsing and syntax/grammar analysis, an additional action of recognizing particular pragmas and keywords is performed. Examples of possible keywords are:

ISS_ON (ISS segment start)
ISS_OFF (ISS segment end)
ISS_START (activate ISS, i.e., cause the processors ISS module to start summing up the executed instructions in the signature register)
ISS_STOP (deactivate ISS)
ISS_CHECK (ISS signature check)
ISS_STATUS (ISS consistency check)
ISS_SUSPEND (ISS suspension, e.g., in case of a function call)
ISS_RESUME (ISS resumption, e.g., when the program returns from a function call to the calling function)
ISS_SUSPENDRESTART (ISS interrupt handling)

The pragmas or keywords may be resolved as library functions. Thus, the following library functions may be provided for:

void FCT_ISS_Start(const ret)
This function loads the value of the parameter ref into the ISS_DATA register. Writing the ISS_DATA register thus sets the current value of the signature to the new argument ref, thus overwriting the previous value. In contrast, writing to the ISS_UPDATE register performs an incremental change of the current signature. Subsequently, the function enables the instruction stream signature tracking (for example, by setting a corresponding bit in an ISS_CTRL register).

void FCT_ISS_Stop( )
This function turns off the instruction stream signature tracking.

void FCT_ISS_Check(const ref)
This function checks, during runtime of the program, that the current ISS_DATA value, stored in the ISS_DATA register, is the expected one, i.e., equal to the value of the parameter ref which has been, during compile time of the program, determined by the instruction signature generator and inserted at the appropriate point, respectively entered into a referenced table of values. If the current ISS_DATA value deviates from the value of the constant parameter ref, a security action is triggered. For example, the instruction signature generator may insert the value for the constant parameter ref at a point upstream of a point of a jump instruction causing the processor to jump to the first instruction of the function FCT_ISS_Check so that the inserted value functions as the parameter ref of the function. For example, if by definition a function parameter is placed in a particular register of the processor, then it suffices to write the value determined by the instruction signature generator into said register prior to the jump instruction.

void FCT_ISS_Status( )
This function checks the contents of the register ISS_DATA. In case an inconsistency is detected, a security action is triggered. This function is typically used in the region where ISS is off and checks if the value of the ISS_DATA register matches a magic constant value. In this way it can be checked if the ISS protected region has been left incorrectly, e.g., skipping the ISS_STOP( ) function. Note that the ISS_STOP( ) leaves the ISS-on domain with a magic constant value.

int FCT_ISS_Suspend( )
This function saves the current contents of the ISS_DATA and ISS_STATUS registers, for example as local variables in the working memory. More precisely, the function retrieves the current values of the ISS_DATA and ISS_STATUS registers as one single integer value (other formats are possible, as well) which may then be saved in the working memory. Subsequently, the instruction stream signature tracking is turned off.

int FCT_ISS_SuspendRestart(const ref)

This function is similar to the previous function FCT_ISS_Suspend( ) Therefore, it also saves the current contents of the ISS_DATA and ISS_STATUS registers and turns of the instruction stream signature tracking. In addition, the value of the parameter ref is loaded as an update value on top of the current ISS_DATA value.

void FCT_ISS_Resume(save)

This function is the counterpart to the two previously introduced functions

FCT_ISS_Suspend and FCT_ISS_Suspend. The function FCT_ISS_Resume turns off the instruction stream signature tracking and restores the ISS_DATA and ISS_CTRL registers for example from variables previously stored in the working memory. The values of the ISS_DATA and ISS_CTRL registers, stored e.g. in the working memory, is input to the function in the form of the single parameter save.

These library functions provide functionality needed for the instruction stream signature support. Furthermore, most programs use (standard) libraries for frequently used functions. These standard libraries typically do not provide instruction stream signature tracking so that the invocation of an unprotected function in one of the standard libraries could result in an undetected error and consequently a security breach. Therefore, a second set of runtime libraries compiled with instruction stream signature support is needed, if a more complete coverage, including runtime library calls, is desired. The binder/linker is controlled by means of signature control information produced by the signature compiler (compiler 210 and compiler module 212) and/or the instruction signature generator 250 that the binder/linker, within instruction signature-protected code segments, uses instruction signature-protected library functions. In particular, the language construct identifier may be configured to identify a protected program code segment for which the instruction signature support is enabled. The compiler module may further include a library call information collector configured to collect library call information relative to software library calls occurring within the protected program code segment and to provide the library call information for usage during a subsequent linking process.

The compiler 210 typically performs a basic block analysis. Preferably the compiler 210 performs also a default path analysis. As an additional action the compiler module 212 may insert implicit signature instructions according to rules for: a) do-while-loop construct; b) while-do-loop construct; c) if-then-else construct; d) various multiple switch constructs. These insertions are done in the code segments marked as instruction signature-protected (e.g., code segments between keywords ISS_ON and ISS_OFF). The language construct identifier 213 may be configured to identify a start and an end of a protected program code segment within the high level language source code for which the instruction signature support is enabled. The placeholder insertion component may be configured to use a result of a corresponding protected segment identification in order to activate the inserting of the at least one instruction signature-related placeholder within the protected program code segment and to deactivate it in a non-protected program code segment.

A further additional action performed by the compiler module 212 (or the compiler 210 upon corresponding invitation by the compiler module 212) is the insertion of explicit signature instructions at program points defined by pragmas and/or keywords:

a) turn on ISS (ISS_START) (also see above)
b) turn off ISS (ISS_STOP) (also see above)
c) ISS signature checking
d) sub function
e) entry points for sub functions (ISS_UPDATE)

Another issue affecting the compiler 210 is the optimization that the typical compiler performs when compiling code. In particular the following two situations may require an adaptation of the optimization behavior of the compiler 210: loop invariants optimization and ISS function calls.

With respect to loop invariants optimization the compiler 210 may come to the conclusion that an instruction signature-related placeholder within a loop is apparently unaffected by the loop and could in fact be moved in front of the loop in order to reduce the number of "executions" of the placeholder. However, in this case the placeholder shall not be optimized but remain within the loop, as every iteration of the loop constitutes a new conditional branch.

Some of the ISS function have a parameter which is patched by the instruction signature generator 250. The instruction signature generator 250 assumes the following code (translated to assembler language):

. . .

MOVW <Rd>, #<const>
BL FCT_ISS_Start

. . .

MOVW moves the constant word value #<const> to the register Rd. Then, using the instruction "BL FCT_ISS_Start" the program (unconditionally) jumps to the label FCT_ISS_Start. These two instructions typically have to be atomic and especially a MOVW instruction independent of the length of the parameter has to be generated.

With respect to code optimization the placeholder insertion component 215 may be configured to verify whether a code optimization of the compiler 210 conflicts with the at least one instruction signature-related placeholder. Upon verifying or determining a conflict, the compiler 210 may be prevented from performing an optimization of the compiled code that affects the at least one instruction signature-related placeholder.

To ease the ISS patching and reference value calculation the compiler/linker 210/240 will provide additional information in a .debug_info DWARF section of the (.elf) file 246:

information about what is code or const;
information about where ISS is enabled, e.g., via a #pragma FCT_ISS ON;
list of all placeholders and corresponding addresses;
information where veneer calls are inserted (calls involving several subsequent branch instructions);
information about switching between several machine languages;
information about tail optimization (one function runs into another);
information about table size in multiple switches using branch table instructions, which are available in several architectures (e.g. TBB instruction);
address ranges of code areas;
address ranges of areas where instruction signature tracking is enabled (e.g., for the correct library functions to be used during linking and/or binding);
addresses of (all) placeholder insertions;
information about function pointer;

information about functions;
(address) information about the ends of functions;
information about switch-case.

To be able to provide the additional instruction stream signature information the linker 240 has to be extended (e.g., by means of the extension 242) to provide the required addresses, e.g. for the placeholder list.

Figure 3:
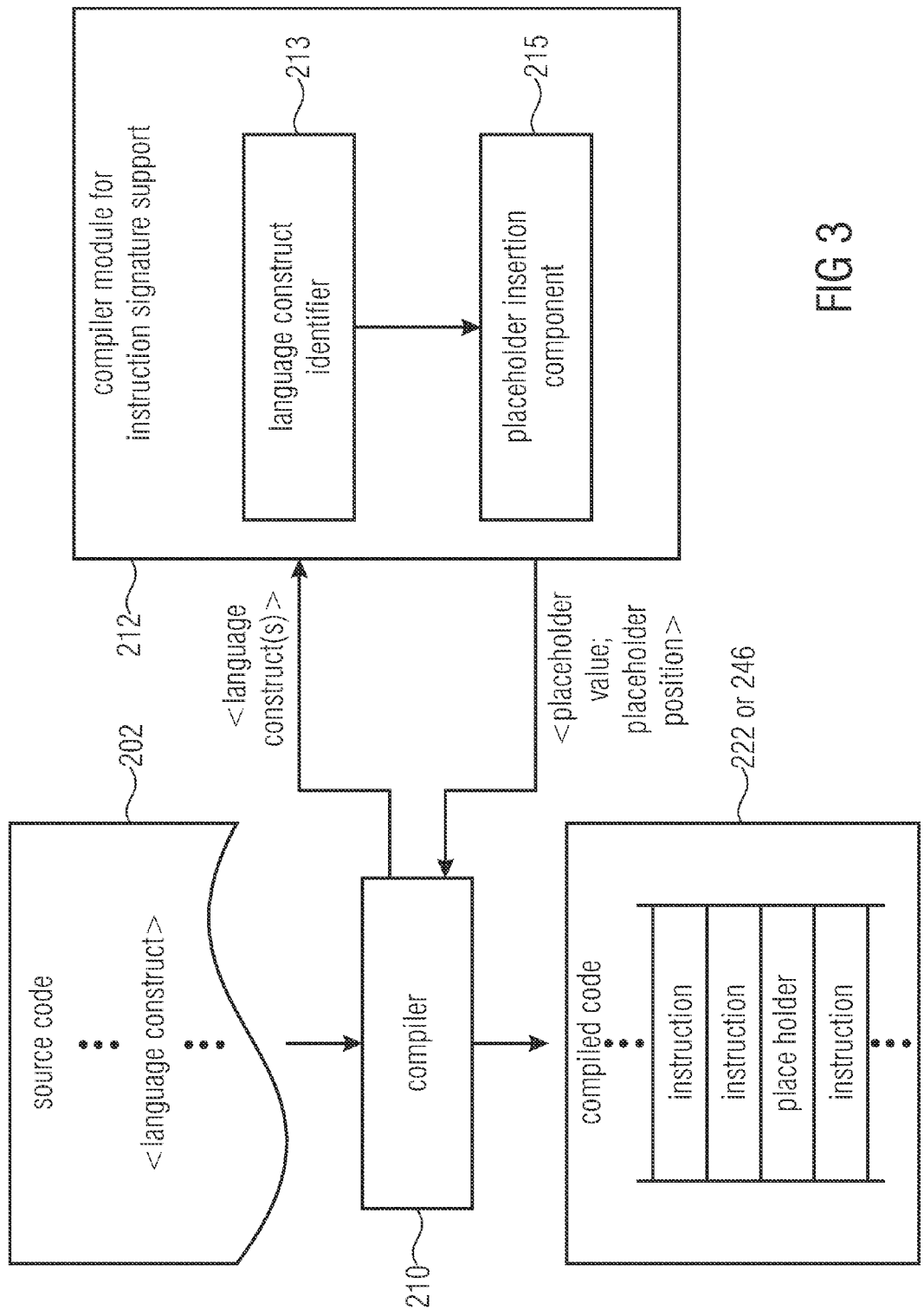
FIG. 3 shows a schematic block diagram of a compiler and a compiler module for providing instruction signature support to the compiler.

FIG. 3 shows a schematic block diagram illustrating an interaction of a (standard) compiler 210 and a compiler module 212 for instruction signature support. As in FIG. 2 the compiler 210 receives a source code 202 including a plurality of language constructs as provided for by the high level programming language used for the source code. Some of the language constructs are relevant for the instruction signature support, such as conditional branches, function calls (in particular functions for which the function address is not known during runtime), and dedicated instruction signature-related language constructs for controlling and verifying the instruction signatures during runtime of the program.

The language constructs may be passed from the compiler 210 to the compiler module 212 which may check whether the language construct gives rise to an insertion of an instruction-signature-related placeholder. To this end the compiler module 212 includes a language construct identifier 213. In case an instruction signature-relevant language construct has been detected, the language construct identifier 213 may inform a placeholder insertion component 215. In particular, the language construct identifier 213 may provide information about where the signature-relevant language construct is located in the source file (e.g., by means of a line number) and the type of the signature-relevant language construct.

Besides the automatic insertion of instruction signature-relevant placeholders, the compiler 210 and/or the compiler module 212 may further provide for an adaptation of the standard code generation to keep the placeholders at the right position. Furthermore, the compiler 210 and/or the compiler module 212 may further provide additional information to make the instruction signature generator 250 more reliable. If possible, the extension of the compiler 210 in order to add instruction signature support to the compiler 210 should have a minimal impact on the code generation and the high level language code should work without special code adaptation beside the usage of instruction stream signature library functions.

The compiler 210 and/or the compiler module 212 may do a basic syntax checking for the ISS library functions. The following rules may be checked:
FCT_ISS_Start( )is followed by FCT_ISS_Stop( )within the code flow of one source file;
FCT_ISS_Suspend( ) and FCT_ISS_SuspendRestart( )are followed by FCT_ISS_Resume( )
only one FCTISS_Resume( )is allowed for a corresponding
FCT_ISS_Suspend( ) or FCT_ISS_SuspendRestart( ).

The placeholder insertion component 215 may then determine a placeholder to be inserted into the compiled code 222 or 246. For example, the placeholder insertion component 215 may determine the (binary) value of the placeholder, its size and its exact location (upstream, downstream, or within the standard instruction(s) of the compiled code produced by the compiler 210 in response to the instruction signature-relevant language construct). This placeholder information may then be sent back to the compiler 210 which uses it to insert it into the compiled code. The compiling of the source code 202 and the insertion of the instruction signature-relevant placeholders may be done step-by-step, i.e., as the compiling process advances, new placeholders are inserted at the program point currently under consideration by the compiler 210.

In the compiled code 222 or 246 the placeholder is inserted into the remainder of the compiled code, in particular the standard compiled instructions.

For the functions and code sequences enclosed with keywords or pragmas indicating the start and the end of ISS-enabled portions of the code, the compiler 210 may automatically insert instruction signature-relevant placeholders according to some basic rules described below.

For conditional code sequences the automatic insertion may be as follows: to handle a non-default path the compiler 210 has to insert an instruction signature-related placeholder for each conditional instruction. All conditional sequences (if-then-else, switch-case, while loop, do while loop, etc.) can be reduced to two base cases which have to be identified by the compiler 210 or the compiler module 212 and handled differently.

It is not required that the compiler 210 or the compiler module 212 does a default path analysis. The compiler 210 or the compiler module 212 may add instruction signature-related placeholders in all conditional paths. In case of unnecessary instruction signature-related placeholders the instruction signature generator 250 may patch them with NOPs (no operations).

A general rule may be that the compiler 210 or the compiler module 212 has to insert a placeholder in front of the next instruction executed after a conditional jump. However, for a do-while loop the compiler 210 or the compiler module 212 has to insert the placeholder directly at the label of the conditional jump (the back edge of the control flow graph).

The compiler module 212 may further include a database interface configured to query a database including a plurality of possible instruction signature-relevant language constructs and corresponding instruction signature-related placeholders for use by the language construct identifier and the placeholder insertion component. The database could also be a part of the compiler module 212. The database may include at least one insertion rule (typically a plurality of insertion rules) for controlling the placeholder insertion component regarding the inserting of the at least one instruction signature-related placeholder.

Figure 4:
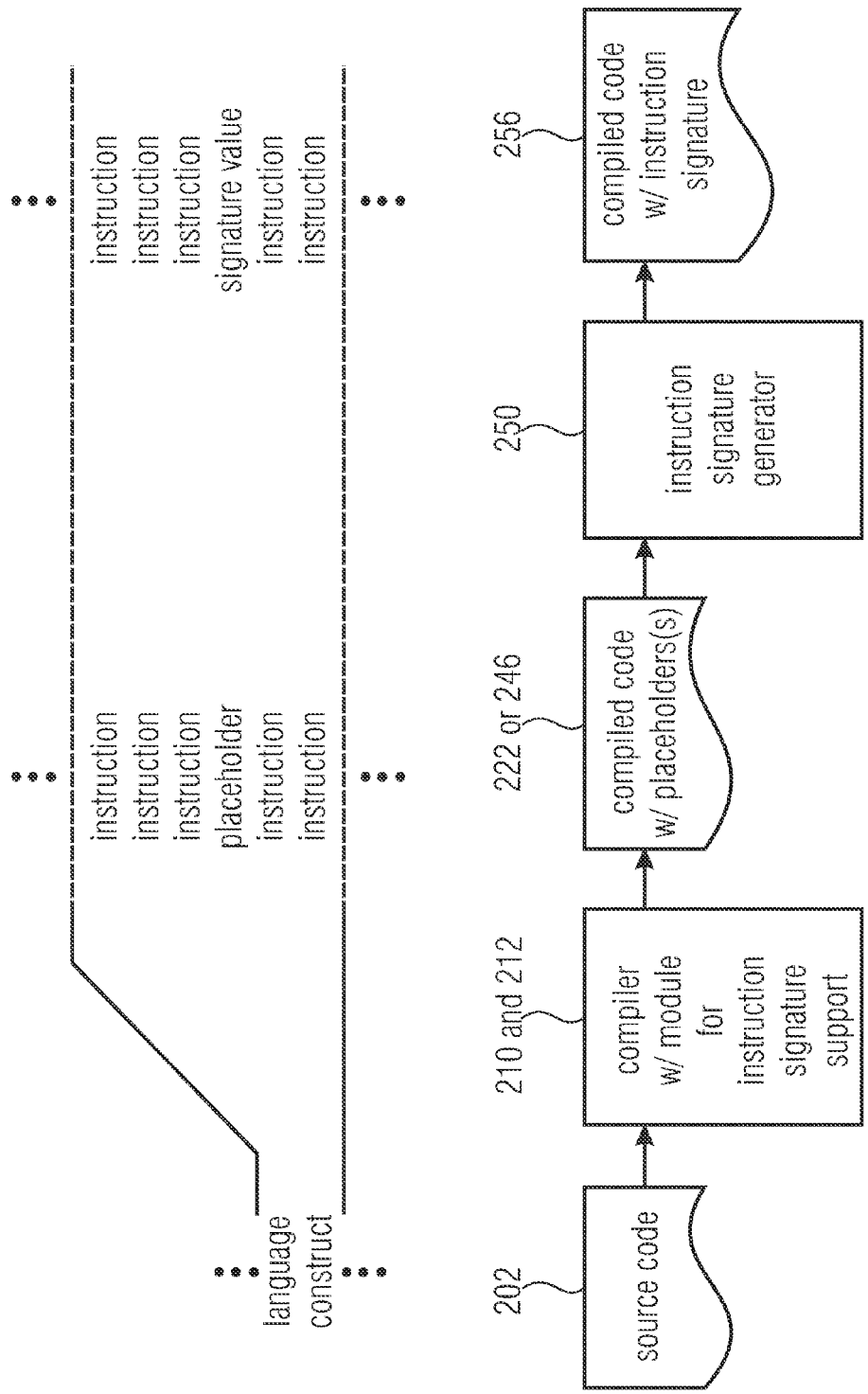
FIG. 4 illustrates the effects of a compiler module for instruction signature support and an instruction signature generator.

FIG. 4 illustrates how an instruction signature-relevant language construct is processed by the two-staged process including compiling the source code 202 and calculating the instruction signatures. The instruction signature-relevant language construct may correspond to several instructions within the compiled code (five instructions in the illustrated example). The compiler 210 with the compiler module 212 is configured to insert an instruction signature-relevant placeholder into the compiled code 222. As can be seen, the placeholder is inserted between the third and the fourth instruction, which may be defined in a database of placeholder insertion rules used by the placeholder insertion component 215 (see FIG. 3). Furthermore, the placeholder insertion component 215 may cause the compiler 210 to insert one of more standard instruction(s), for example, to load a constant value into a register of the processor, such as the signature value later calculated by the instruction signature generator 250. The compiled code 222 with the inserted placeholder(s) represents a compiler interface data structure linking the instruction signature-enhanced compiler and the subsequent instruction signature generation.

The instruction signature generator 250 is configured to detect the placeholder and to determine the appropriate signature value which is then inserted into the compiled code 222 at the location of the placeholder. The instruction signature generator 250 outputs the compiled code 222 with instruction signatures 256.

Figure 5:
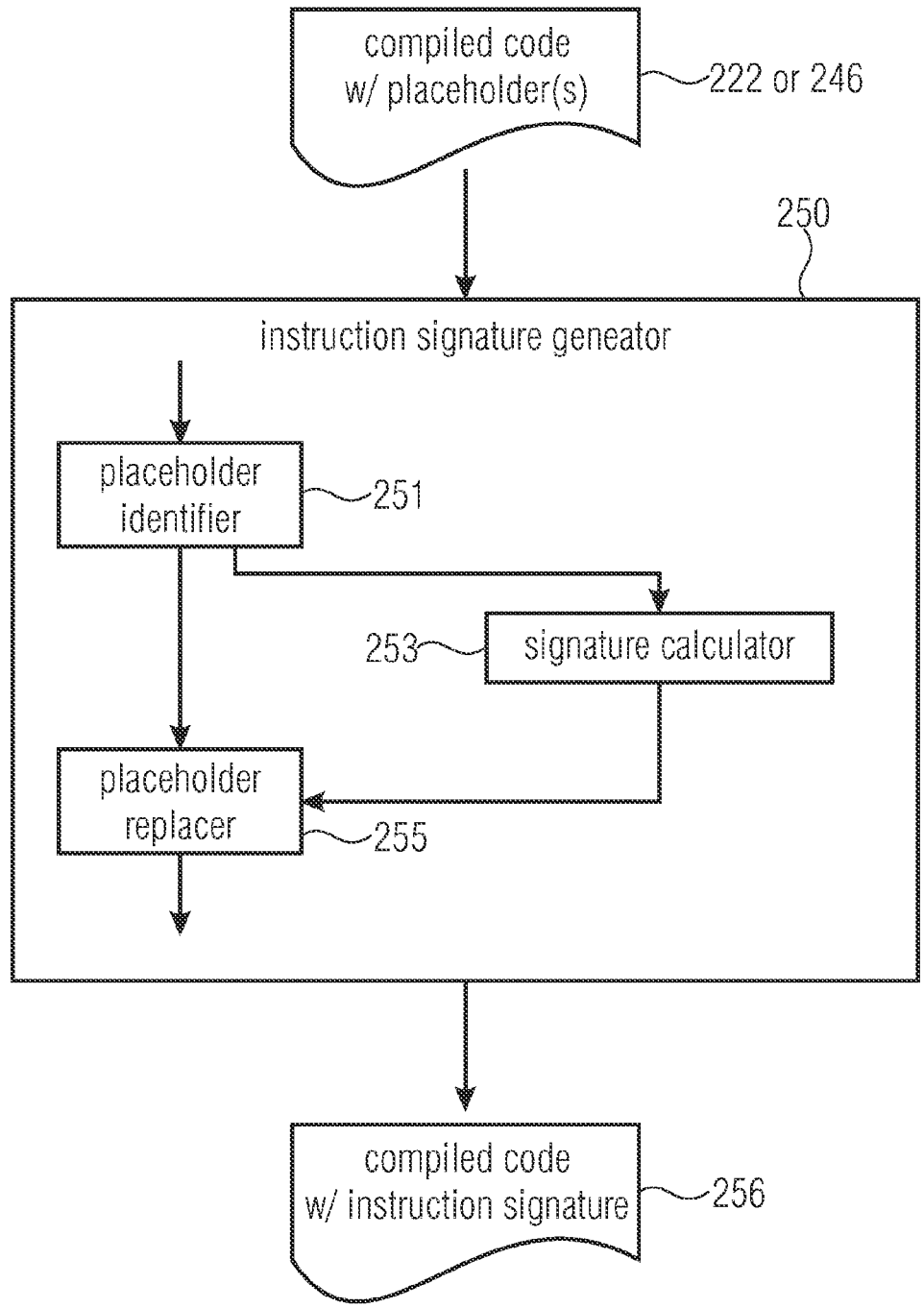
FIG. 5 shows a schematic block diagram of an instruction signature generator.

FIG. 5 shows a schematic block diagram of an instruction signature generator 250 according to an embodiment. The instruction signature generator 250 includes a placeholder identifier 251, a signature calculator 253, and a placeholder replacer 255. The placeholder identifier 251 is configured to receive the compiled code 222 or 246 (e.g., assembler code or machine code) and to search for patterns that are indicative of a placeholder. For example, the placeholder may be an opcode that is actually not used by the compiler 210 or the processor on which the eventual program is intended to run. The invalid opcode should be removed prior to executing the program on the processor in order to avoid runtime errors. The placeholder identifier 251 may also or alternatively receive concise information about the placeholders that have been inserted into the compiled code provided by the compiler module 212 (see FIG. 4), for example via a placeholder information interface. When present, the placeholder information interface may be configured to receive placeholder information including auxiliary information about the placeholder and to provide the auxiliary information to the signature calculator 253. The auxiliary information may include at least one of a size of a table relative to a multiple branch point within the compiled code, a memory address indicating an end of a function, a list including information about the at least one placeholder inserted into the compiled code and its placeholder position, and an address table indicating a start and an end of at least one protected code segment within the compiled code for which the instruction signature support is enabled. The signature calculator 253 is configured to use the address table for determining the signature value.

Once a placeholder has been found or generated by the placeholder identifier 251, information about the placeholder is forwarded to the signature calculator 253. As explained above, the signature calculator 253 is configured to calculate the actual signature value for the placeholder location that is currently processed. The signature value may be a start value, an update value, or a reference value as previously described herein. The signature calculator 253 may be configured to perform a basic block analysis on the compiled code on the basis of which the signature value is calculated.

The signature value determined by the signature calculator 253 and the information about, e.g., the placeholder location is supplied to the placeholder replacer 255 which is configured to perform the replacing of the placeholder with the calculated signature value. The compiled code segment provided or generated by the placeholder replacer 255 typically occupies a space in the compiled code that is equal to a space occupied by the instruction signature-related placeholder. The compiled code segment may include a processor instruction. The placeholder replacer 255 may be configured to select a particular processor instruction from a plurality of processor instructions and to generate the compiled code segment on the basis of the particular processor instruction.

Figure 6:
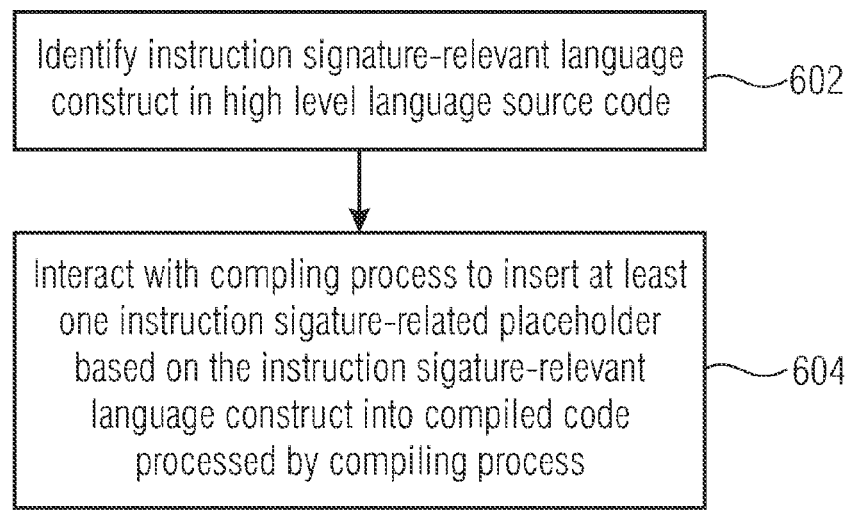
FIG. 6 shows a schematic flow diagram of a method for processing instruction signature-relevant information.

FIG. 6 shows a schematic flow diagram of a method according to an embodiment which is typically used for processing instruction signature-relevant information during a compiling process of a high level language source code.

At an action 602 an instruction signature-relevant language construct in a high level language source code is identified. This may be done on the basis of an identification of keywords or pragmas within the high level language source code.

An interaction with a compiling process is performed during a subsequent action 604 in order to insert at least one instruction signature-related placeholder based on the instruction signature-relevant language construct into a compiled code that is currently processed (or has already been processed) by a compiling process.

Although some aspects have been described in the context of an apparatus, these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments include a data carrier having electronically readable control signals, which are capable of cooperating with a programmable computer system, such that one of the methods described herein is performed.

Generally, the embodiments described herein can be implemented as a computer program product with a program code, the program code being operative for performing one of the methods when the computer program product runs on a computer. The program code may for example be stored on a machine readable carrier.

Other embodiments include the computer program for performing one of the methods described herein, stored on a machine readable carrier.

In other words, one embodiment is, therefore, a computer program having a program code for performing one of the methods described herein, when the computer program runs on a computer.

A further embodiment is, therefore, a data carrier (or a digital storage medium, or a computer-readable medium) including, recorded thereon, the computer program for performing one of the methods described herein. The data carrier, the digital storage medium or the recorded medium are typically tangible and/or non-transitionary.

A further embodiment is, therefore, a data stream or a sequence of signals representing the computer program for performing one of the methods described herein. The data stream or the sequence of signals may for example be configured to be transferred via a data communication connection, for example via the Internet.

A further embodiment includes a processing means, for example a computer, or a programmable logic device, configured to or adapted to perform one of the methods described herein.

A further embodiment includes a computer having installed thereon the computer program for performing one of the methods described herein.

A further embodiment includes an apparatus or a system configured to transfer (for example, electronically or optically) a computer program for performing one of the methods described herein to a receiver. The receiver may, for example, be a computer, a mobile device, a memory device or the like.

The apparatus or system may, for example, include a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A non-transitory compiler module stored in readable medium having instructions stored thereon for providing instruction signature support to a compiler, the compiler module comprising:
   a language construct identifier configured to identify an instruction signature-relevant language construct in a high level language source code supplied to the compiler and to identify a protected program code segment for which the instruction signature support is enabled;
   a placeholder insertion component configured to interact with the compiler for inserting at least one instruction signature-related placeholder based on the instruction signature-related language construct into a compiled code processed by the compiler on the basis of the high level language source code; and
   a library call information collector configured to collect library call information relative to software library calls occurring within the protected program code segment and to provide the library call information for usage during a subsequent linking process.

2. The compiler module according to claim 1, wherein the insertion of the signature-related placeholder preserves a logical function of the original high-level language code given to the compiler.

3. The compiler module according to claim 1, further comprising a database interface configured to query a database comprising a plurality of possible instruction signature-relevant language constructs and corresponding instruction signature-related placeholders for use by the language construct identifier and the placeholder insertion component.

4. The compiler module according to claim 3, wherein the plurality of possible instruction signature-relevant language constructs comprises at least one of a conditional jump, an if-then construct, a switch-case construct, a while-loop construct, a do-while construct, and a dedicated instruction signature-related keyword.

5. The compiler module according to claim 3, wherein the database further comprises at least one insertion rule for controlling the placeholder insertion component regarding the inserting of the at least one instruction signature-related placeholder.

6. The compiler module according to claim 1, wherein the compiled code is machine language code and wherein the placeholder insertion component is configured to select the at least one instruction signature-related placeholder so that a size of the at least one instruction signature-related placeholder is equal to a size of a machine language instruction or a sequence of machine language instructions eventually replacing the at least one instruction signature-related placeholder in the compiled code.

7. The compiler module according to claim 1, wherein the at least one instruction signature-related placeholder is one of a placeholder for a reference signature value, a placeholder for a signature update value, and a placeholder for an instruction signature-related instruction.

8. The compiler module according to claim 1, further comprising a placeholder information collector configured to collect placeholder information about instruction signature-related placeholders inserted into the compiled code and to output the placeholder information.

9. The compiler module according to claim 1, wherein the language construct identifier is configured to identify a start and an end of a protected program code segment within the high level language source code for which the instruction signature support is enabled, and wherein the placeholder insertion component is configured to use a result of a corresponding protected segment identification in order to activate the inserting of the at least one instruction signature-related placeholder within the protected program code segment and to deactivate the inserting of the at least one instruction signature-related placeholder in a non-protected program code segment.

10. The compiler module according to claim 1, wherein the placeholder insertion component is further configured to verify whether a code optimization of the compiler conflicts with the at least one instruction signature-related placeholder and, upon verifying a conflict, to prevent the compiler from performing an optimization of the compiled code that affects the at least one instruction signature-related placeholder.

11. A non-transitory instruction signature generator stored in readable medium having instructions stored thereon, comprising:
   an input for a compiled code;
   a placeholder identifier configured to identify an instruction signature-related placeholder in the compiled code;
   a signature calculator configured to determine a signature value for a program point in the compiled code at which the instruction signature-related placeholder occurs;
   a placeholder replacer configured to insert a compiled code segment on the basis of the signature value at the program point; and
   a placeholder information interface configured to receive placeholder information comprising auxiliary information about the instruction signature-related placeholder and to provide the auxiliary information to the signature calculator,
   wherein the auxiliary information comprises an address table indicating a start and an end of at least one protected code segment within the compiled code for which the instruction signature support is enabled, and wherein the signature calculator is configured to use the address table for determining the signature value.

12. The instruction signature generator according to claim 11, wherein the compiled code is one of a machine language code and an assembler code.

13. The instruction signature generator according to claim 11, wherein the compiled code segment generated by the placeholder replacer occupies a space in the compiled code that is equal to a space occupied by the instruction signature-related placeholder.

14. The instruction signature generator according to claim 11, wherein the compiled code segment comprises a processor instruction and wherein the placeholder replacer is configured to select a particular processor instruction from a plurality of processor instructions and to generate the compiled code segment on the basis of the particular processor instruction.

15. The instruction signature generator according to claim 11, wherein the signature calculator is configured to perform a basic block analysis on the compiled code on the basis of which the signature value is calculated.

16. A method for processing instruction signature-relevant information during a compiling process of a high level language source code, the method comprising:
    identifying a protected program code segment for which the instruction signature support is enabled;
    identifying an instruction signature-relevant language construct in the high level language source code;
    interacting with the compiling process in order to insert at least one instruction signature-related placeholder based on the instruction signature-relevant language construct into a compiled code processed by the compiling process on the basis of the high level language source code;
    collecting library call information relative to software library calls occurring within the protected program code segment; and
    providing the library call information for usage during a subsequent linking process.

17. The method according to claim 16, wherein the signature-related placeholder is transparent to the compiling process.

18. The method according to claim 16, further comprising:
    querying a database comprising a plurality of possible instruction signature-relevant language constructs and corresponding instruction signature-related placeholders to be used during the identifying of the instruction signature-relevant language construct and during the interacting with the compiling process.

19. The method according to claim 18, wherein the plurality of possible instruction signature-relevant language constructs comprises at least one of a conditional jump, an if-then construct, a switch-case construct, a while-loop construct, a do-while construct, and a dedicated instruction signature-related keyword.

20. The method according to claim 18, wherein the database further comprises at least one insertion rule for controlling the inserting of the at least one instruction signature-related placeholder.

21. The method according to claim 16, wherein the compiled code is machine language code and wherein the at least one instruction signature-related placeholder is selected so that a size of the at least one instruction signature-related placeholder is equal to a size of a machine language instruction or a sequence of machine language instructions eventually replacing the at least one instruction signature-related placeholder in the compiled code.

22. The method according to claim 16, wherein the instruction signature-related placeholder is one of a placeholder for a reference signature value, a placeholder for a signature update value, and a placeholder for an instruction signature-related instruction.

23. The method according to claim 16, further comprising:
    collecting placeholder information about instruction signature-related placeholders inserted into the compiled code; and
    outputting the placeholder information.

24. The method according to claim 16, further comprising:
    identifying, as a protected segment identification, a start and an end of a protected program code segment within the high level language source code for which the instruction signature support is enabled; and
    using a result of the protected segment identification in order to activate the inserting of the at least one instruction signature-related placeholder within the protected program code segment and to deactivate the inserting of the at least one instruction signature-related placeholder within the protected program code segment in a non-protected program code segment.

25. The method according to claim 16, further comprising:
    verifying whether a code optimization of the compiling process conflicts with the at least one instruction signature-related placeholder and, upon finding a conflict, preventing the compiling process from performing an optimization of the compiled code that affects the at least one instruction signature-related placeholder.

26. A non-transitory computer readable digital storage medium having stored thereon a computer program having a program code for performing, when running on a computer, a method for processing instruction signature-relevant information during a compiling process of a high level language source code, the method comprising:
    identifying a protected program code segment for which the instruction signature support is enabled;
    identifying an instruction signature-relevant language construct in the high level language source code;
    interacting with the compiling process in order to insert at least one instruction signature-related placeholder based on the instruction signature-relevant language construct into a compiled code processed by the compiling process on the basis of the high level language source code;
    collecting library call information relative to software library calls occurring within the protected program code segment; and
    providing the library call information for usage during a subsequent linking process.

* * * * *

UNITED STATES PATENT AND TRADEMARK OFFICE
CERTIFICATE OF CORRECTION

PATENT NO.         : 8,694,977 B2                                                     Page 1 of 1
APPLICATION NO.    : 13/184135
DATED              : April 8, 2014
INVENTOR(S)        : S. Mangard et al.

It is certified that error appears in the above-identified patent and that said Letters Patent is hereby corrected as shown below:

Title Page 1, Item (56) Other Publications, column 2, line 2, please change "Transations on" to -- Transactions on --

Signed and Sealed this
Twenty-second Day of July, 2014

Michelle K. Lee
*Deputy Director of the United States Patent and Trademark Office*